R. C. FAY.
TURNING LATHE.
APPLICATION FILED APR. 17, 1912.
1,132,920.
Patented Mar. 23, 1915.
2 SHEETS—SHEET 1.
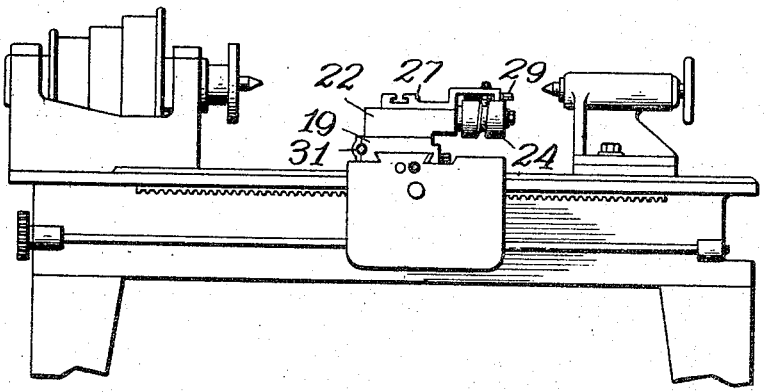
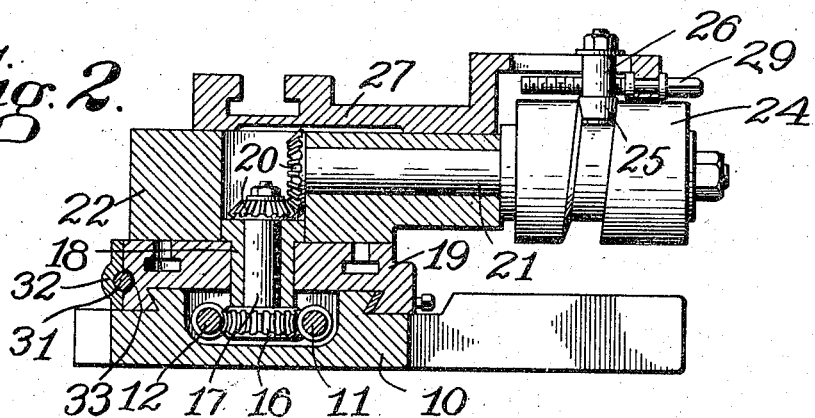
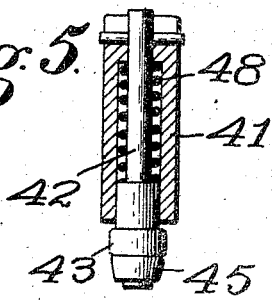
Witnesses.
C. F. Mason.
E. M. Allen.
Inventor
Rimmon C. Fay.
By Attorneys
Southgate & Southgate

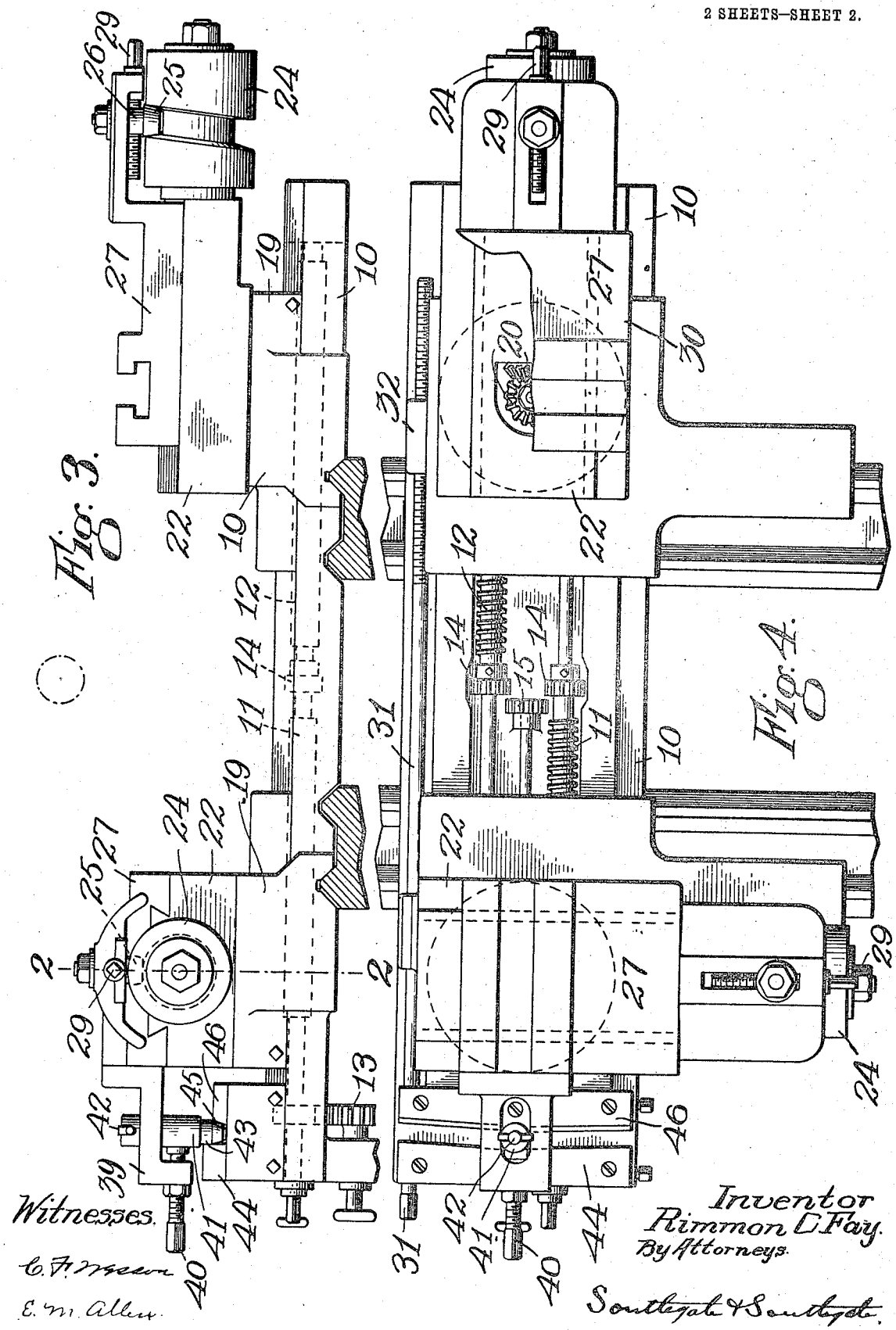

UNITED STATES PATENT OFFICE.

RIMMON C. FAY, OF PHILADELPHIA, PENNSYLVANIA.

TURNING-LATHE.

1,132,920. Specification of Letters Patent. Patented Mar. 23, 1915.

Application filed April 17, 1912. Serial No. 691,340.

*To all whom it may concern:*

Be it known that I, RIMMON C. FAY, a citizen of the United States, residing at Philadelphia, in the county of Philadelphia and State of Pennsylvania, have invented a new and useful Turning-Lathe, of which the following is a specification.

Important objects of my invention are to make the turning lathe more nearly automatic in its operation and to increase the range of operations of the taper turning attachment. These improvements are designed particularly for use in the manufacture of parts which are manufactured in quantities, and the mechanism is so simple that their cost will be reduced when only a few parts are required.

The nature and scope of my invention will be more fully understood from the following description taken in connection with the accompanying drawings forming part of this specification in which—

Figure 1 is a side elevation of an engine lathe with one form of my invention applied thereto. Fig. 2 is a vertical sectional view on the line 2—2 of Fig. 3 of the lathe carriage with compound rest showing certain features of my invention. Fig. 3 is an elevation of the same. Fig. 4 is a plan, and Fig. 5 is a sectional view of a detail.

The base of the lathe carriage 10 has a pocket in which are shown journaled two parallel worms 11 and 12 located substantially in the position of the cross feed screw ordinarily used. One of them 11 is operated by the same train of gears 13 as is ordinarily used for operating the cross feed screw. They have spur gears 14 adapted to be connected by a slip gear 15 to cause both to run together. Each worm operates a worm gear 16, one at the back and one at the front. The worms extend clear across and each is plain where it comes adjacent to the other gear. The second worm and its connected parts are used when it is desired to employ a second compound rest. The gear 16, through the medium of a vertical shaft 17 in a bushing 18 on the slide 19 and bevel gears 20, operates a horizontal cam feed shaft 21. This is carried on a support 22. This turns about the axis of the shaft 17, so that the cam feed shaft can be operated no matter what the position of the support 22. The cam shaft 21 in connection with suitable mechanism supports a feed cam 24 which in combination with its cam roll 25 and its adjustable cam roll stud 26 supplies a power feed to the tools mounted upon the tool holding carriage 27. The cam 24 is detachable and can be made in any desired form that may be necessary to supply the variable feeding movement desired for machining the articles for which it may be required. The roll stud 26, screw 29 and its connecting parts provide a micrometer adjustment for setting tools to exact dimensions. One end of the cam 25 can be magnetized to hold the roll in contact and then the other end and the other wall of the groove can be omitted. The magnetized part preferably is separated from the shaft by a non-magnetic bushing. On some articles a second tool carriage 30 can be used to advantage. When this is the case I place it back of the center line of the lathe and operate the tools upside down by the worm 12 and second worm wheel 16. This second carriage is similar to the first one and operated by the same feed mechanism. When two carriages are used I join them together by a screw 31 working in a half nut 32 formed in a cap secured to the slide. The slide at this point has a plain socket 33 for receiving the screw. Thus either carriage may be operated from the other. When located these carriages are retained in position by gib screws (not shown). This improved carriage can be applied to lathes now made thus securing the advantages of all the speeds, feeds, and other special features which they may possess. The vertical feed shaft 17 being located in the center of the circle of the compound rest the automatic feed can be operated at any angle. Therefore in turning spur gears with two tools in the front carriage a rough and finishing chip can be taken on the outside diameter and at the same time the edges can be squared with back tools. On bevel gears the face can be turned with back tool while the ends of the teeth are being machined with the front tools, all of these operations being performed automatically after the piece is placed in the lathe and the machine started.

An important advantage of this invention is that it can be applied to practically all kinds of engine lathes without expensive changes, and that when the changes are made the cost of the new parts will exceed those of the parts for which they are substituted by a very small proportion only. For example the ordinary apron of the lathe with all the mechanism with which it is usually provided is retained and for the base of the carriage is substituted another base almost the same in design, but having some slight modifications. Then the parts which it supports are replaced by other parts which are not very expensive. The parts preferably are designed so that the old tool posts can be employed. These features are shown as combined with an improved taper turning attachment. To apply it the half nut 32 is taken off and the gib screws of the carriage loosened. A screw 40 is shown for connecting a supporting bracket 39 with a stud 41 for a vertical former pin 42. This former pin has a roll 43 thereon for engaging the operative surface of a former 44 which guides the pin and therefore controls the position of the carriage at all points during its traverse. Means is shown for holding the roll 43 accurately in position comprising a tapered roll 45 on the pin which runs in contact with a beveled surface 46 complementary to the surface of the former 44. A spring 48 tends to hold the rolls down and thus continuously keep the roll 43 crowded against the surface 44. As previously made the taper turning devices in general use are used for turning tapers only and cannot be applied for any other service, with my invention single tapers, double tapers, or irregular forms can be turned.

The operation is as follows: The downward pressure of the spring 48 insures contact of rolls with both formers thus eliminating all lost motion and causing the turning tool to follow the outline of the former.

I do not limit my invention to the form herein illustrated and described or to the particular manner shown for connecting it with the tool holder, as this may be modified in various ways, nor do I limit it to machine tools as the formers 44 and 46 virtually constitute a cam, and this arrangement is useful for many kinds of cams on many types of machines.

Although I have illustrated and described only one form of the invention and shown it as applied to a single type of engine lathe, I am aware that many modifications can be made in the form shown, and that it can be applied to practically all types of engine lathes without departing from the scope of the invention as expressed in the claims. Therefore I do not wish to be limited in these respects, but What I do claims is:—

1. In a device of the character described, the combination of a slide, a shaft carried by the slide, means for transmitting power to the shaft to turn it in different positions of the slide, a support on the slide rotatable about the axis of the shaft, a tool holder movable on said support and means connected with the shaft for reciprocating said tool holder along the support with a predetermined variable feed independently of the position of the support and slide.

2. In a device of the character described, the combination with a lathe carriage base, of a slide movable therealong, a vertical shaft carried by the slide, means for transmitting power to the shaft to turn it in different positions of the slide, a support on the slide rotatable about the axis of the vertical shaft, a tool holder movable on said support and means connected with the vertical shaft for reciprocating said tool holder along the support with a predetermined variable feed independently of the position of the support and slide.

3. The combination with a lathe carriage base having a reciprocable slide thereon, and a support resting on the slide and rotatable thereon about a vertical axis, of a vertical shaft axially in alinement with the center of rotation of said support, means for rotating said vertical shaft by power independently of the positions of the slide and support, a feed shaft mounted in bearings on the rotatable support, means for transmitting a motion of rotation from the vertical shaft to the feed shaft, a tool holder movable along said support, and rotary means on said feed shaft for reciprocating the tool holder.

4. The combination with a lathe carriage base having a reciprocable slide thereon, and a support resting on the slide and rotatable thereon about a vertical axis, of a worm carried by said base, a vertical shaft axially in alinement with the center of rotation of said support, a worm wheel on said shaft engaging said worm to be operated thereby, a feed shaft mounted on the rotatable support, means for transmitting a motion of rotation from the vertical shaft to the feed shaft, a tool holder movable along said support, and means on the end of said feed shaft for variably reciprocating the tool holder.

5. In a tool rest, the combination of a support adapted to swing about a center, a radial feed shaft carried by said support, a tool holder movable on said support, means for transmitting power to said feed shaft to rotate it, a cam fixed on said feed shaft and having a cam groove, a roll stud mounted on the tool rest and adapted to project into said cam groove, a screw on the tool rest for adjusting said roll stud, and means for transmitting power from the feed shaft to the tool rest to reciprocate it radially in all positions of the support.

6. In a tool rest, the combination of a support adapted to swing in a horizontal plane about its center, a radial feed shaft carried by said support, a tool holder movable on said support parallel with the feed shaft, means centrally located with respect to the center on which the support turns for transmitting power to said feed shaft to rotate it, a cam on said feed shaft, a roll stud in position to be operated by the cam and connected with the tool rest for operating it, and means for adjusting the roll stud relatively to the tool rest.

7. In a tool rest, the combination of a support adapted to swing in a horizontal plane about its center, a radial feed shaft carried by said support, a tool holder movable on said support parallel with the feed shaft, means centrally located with respect to the center on which the support turns for transmitting power to said feed shaft to rotate it, a cam fixed on said feed shaft and having a cam groove, a roll stud mounted on the tool rest and adapted to project into said cam groove, a screw on the tool rest for adjusting said roll stud, and means for transmitting power from the feed shaft to the tool rest to reciprocate it radially in all positions of the support.

8. In a lathe, the combination with a tool rest having a base and a tool support adapted to move relatively to the base, of a guide for said tool support comprising two opposite surfaces, a pin connected with the tool support, and a roller on said pin and adapted to engage one of said surfaces, the other surface constituting means for keeping the roller in contact with the first surface.

9. In a lathe, the combination with a tool rest having a movable tool support, of a stationary guide for said tool support, a roller adapted to engage the guide, a second guide substantially parallel with the first named guide, and yielding means connected with the tool support and coöperating with the second guide for holding said roller in contact with the guide.

10. In a lathe, the combination with a tool rest having a base and a tool support adapted to move relatively to the base, of a guide for said tool support comprising two opposite surfaces, a pin connected with the tool support, a pair of rollers on said pin between said surfaces, one adapted to engage one of said surfaces, and the other the other surface, and yielding means for forcing said rollers into contact with the surfaces.

11. In a lathe, the combination with a compound tool rest, of a guide for the tool rest comprising a pair of opposite formers, one having a vertical surface and the other an inclined surface, a vertical pin connected with the tool rest, and two rollers on the pin, one engaging said vertical surface and the other the inclined surface.

12. In a lathe, the combination with a compound tool rest, of a guide for the tool rest comprising a pair of opposite formers, one having a vertical surface and the other an inclined surface, a vertical pin connected with the tool rest, two rollers on the pin, one engaging said vertical surface and the other the inclined surface, and means for forcing the pin toward said inclined surface, whereby the roller engaging it will act to keep the other roller in contact with the vertical surface.

13. The combination with a cam having a guiding surface and a complementary slanted surface, of a roll to be guided by the cam, a pin or stud on which the roll is journaled, a second roll on said pin or stud of conical form, yielding means for pressing the pin longitudinally in a direction to keep the conical roll against the slanting surface, whereby it will keep the other roll constantly in contact with the guiding surface.

In testimony whereof I have hereunto set my hand, in the presence of two subscribing witnesses.

RIMMON C. FAY.

Witnesses:
ALBERT E. FAY,
C. FORREST WESSON.